US010077655B2

(12) United States Patent
von Schönebeck et al.

(10) Patent No.: US 10,077,655 B2
(45) Date of Patent: *Sep. 18, 2018

(54) MILLING MACHINE, IN PARTICULAR SURFACE MINER, AND METHOD FOR MINING MILLED MATERIAL OF AN OPEN CAST SURFACE

(71) Applicant: Wirtgen GmbH, Windhagen (DE)

(72) Inventors: Winfried von Schönebeck, Vettelschoss (DE); Stefan Wagner, Bad Honnef (DE)

(73) Assignee: Wirtgen GmbH (DE)

( * ) Notice: Subject to any disclaimer, the term of this patent is extended or adjusted under 35 U.S.C. 154(b) by 190 days.

This patent is subject to a terminal disclaimer.

(21) Appl. No.: 14/841,819

(22) Filed: Sep. 1, 2015

(65) Prior Publication Data

US 2016/0061030 A1    Mar. 3, 2016

Related U.S. Application Data

(63) Continuation of application No. 13/965,892, filed on Aug. 13, 2013, now Pat. No. 9,126,776, which is a (Continued)

(30) Foreign Application Priority Data

Feb. 8, 2008  (DE) .......................... 10 2008 008 260

(51) Int. Cl.
 *E01C 23/088* (2006.01)
 *E21C 41/26* (2006.01)
 (Continued)

(52) U.S. Cl.
 CPC .............. *E21C 41/26* (2013.01); *B65G 67/22* (2013.01); *E01C 23/088* (2013.01);
 (Continued)

(58) Field of Classification Search
 CPC ............................. E01C 23/088; E21C 41/26
 See application file for complete search history.

(56) References Cited

U.S. PATENT DOCUMENTS 3,608,968 A   9/1971  Burnett
4,376,609 A   3/1983  Bohman et al.
(Continued)

FOREIGN PATENT DOCUMENTS

DE        155157     5/1982
DE    19628420 A1    1/1998
(Continued)

OTHER PUBLICATIONS

Database Compendex XP-002538700, Engineering Information, Inc., Wolski Jan K, "Optimization of Bucket Wheel Excavator and Pit Parameters in Application to Overburden Stripping", Conference Proceeding "Use of Computers in the Coal Industry",1986, pp. 43-55.
(Continued)

*Primary Examiner* — John J Kreck
(74) *Attorney, Agent, or Firm* — Lucian Wayne Beavers; Gary L. Montle; Patterson Intellectual Property Law, PC

(57) ABSTRACT

In a method for milling an opencast mining surface or for milling off layers of an asphalt or concrete traffic surface with a milling machine removing the ground surface, by milling the ground surface along a predetermined milling track and by transporting the milled material via a conveying device to at least one container of a truck that travels along next to the milling machine, a relative position between the container and the conveying device is automatically controlled to regulate the loading of the container.

12 Claims, 4 Drawing Sheets

Figure 5:
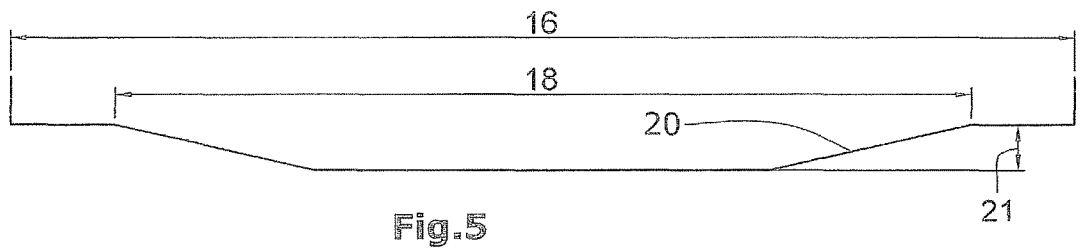

Related U.S. Application Data continuation of application No. 12/865,041, filed as application No. PCT/EP2009/051383 on Feb. 6, 2009, now Pat. No. 8,528,988.

(51) Int. Cl.

| | | |
|---|---|---|
| *E01C 23/12* | (2006.01) | |
| *B65G 67/22* | (2006.01) | |
| *E21C 47/00* | (2006.01) | |
| *E21C 25/10* | (2006.01) | |
| *E21C 25/68* | (2006.01) | |

(52) U.S. Cl.
CPC ............ *E01C 23/127* (2013.01); *E21C 25/10* (2013.01); *E21C 25/68* (2013.01); *E21C 47/00* (2013.01)

(56) References Cited

U.S. PATENT DOCUMENTS

| | | | |
|---|---|---|---|
| 4,647,248 A * | 3/1987 | Wirtgen | ............... E01C 23/088 198/511 |
| 4,863,009 A | 9/1989 | Winkel et al. | |
| 5,575,316 A | 11/1996 | Pollklas | |
| 5,857,274 A | 1/1999 | Rüdiger et al. | |
| 6,247,510 B1 | 6/2001 | Diekhans et al. | |
| 6,366,684 B1 | 1/2002 | Turner | |
| 6,682,416 B2 | 1/2004 | Behnke et al. | |
| 6,943,824 B2 * | 9/2005 | Alexia | ................. A01D 43/073 348/120 |
| 7,831,345 B2 | 11/2010 | Heino et al. | |
| 8,337,118 B2 | 12/2012 | Buschmann et al. | |
| 8,499,537 B2 | 8/2013 | Correns et al. | |
| 8,528,988 B2 * | 9/2013 | Von Schonebeck | ........................ E01C 23/088 299/1.5 |
| 8,590,983 B2 | 11/2013 | Berning et al. | |
| 9,126,776 B2 * | 9/2015 | von Schonebeck | .. E01C 23/088 |
| 2003/0174207 A1 | 9/2003 | Alexia et al. | |
| 2005/0179309 A1 | 8/2005 | Berning et al. | |
| 2005/0207841 A1 | 9/2005 | Holl et al. | |
| 2006/0045621 A1 | 3/2006 | Potts et al. | |
| 2008/0173740 A1 * | 7/2008 | Parker | ................... E01C 23/088 241/33 |
| 2008/0258535 A1 | 10/2008 | Berning et al. | |
| 2009/0044505 A1 | 2/2009 | Huster et al. | |
| 2009/0229233 A1 | 9/2009 | Pollklass et al. | |
| 2009/0267402 A1 | 10/2009 | Berning et al. | |
| 2010/0014917 A1 | 1/2010 | Willis et al. | |
| 2011/0061762 A1 | 3/2011 | Madsen et al. | |
| 2011/0064274 A1 | 3/2011 | Madsen et al. | |
| 2011/0123268 A1 | 5/2011 | Berning et al. | |
| 2013/0076101 A1 | 3/2013 | Simon | |
| 2013/0080000 A1 | 3/2013 | Von der Lippe et al. | |

FOREIGN PATENT DOCUMENTS

| | | |
|---|---|---|
| DE | 102005035480 A1 | 2/2007 |
| DE | 202007005756 U1 | 8/2008 |
| EP | 1574122 B1 | 2/2008 |
| EP | 2100495 A1 | 9/2009 |
| EP | 2301318 B1 | 11/2011 |
| EP | 2452551 A2 | 5/2012 |
| EP | 2573267 A1 | 3/2013 |

OTHER PUBLICATIONS

Database Compendex XP-002538699, Engineering Information, Inc., Gove et al. "Optimizing Truck-Loader Matching", Mining Engineering, Oct. 1994, pp. 1179-1185, Soc. for Mining, Metallurgy & Exploration, Inc.
International Search Report dated Aug. 20, 2009. (not prior art).
Office Action in U.S. Appl. No. 13/624,586 to Jorn Von der Lippe, dated Mar. 31, 2015, 28 pp. (not prior art).
European Search Report in corresponding European Publication EP 13 18 1254, dated Nov. 4, 2013, 3 pp (not prior art).

* cited by examiner

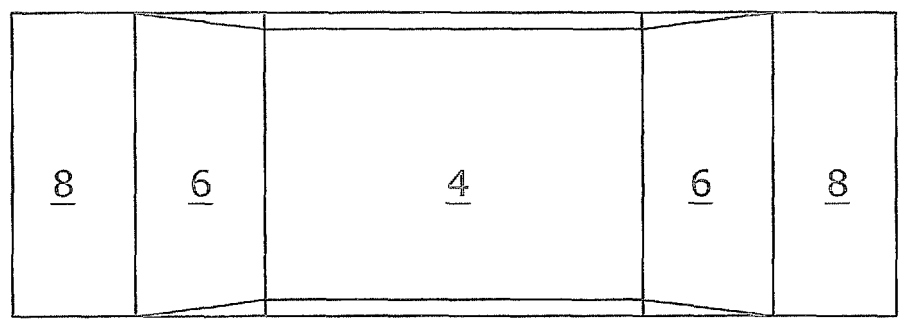
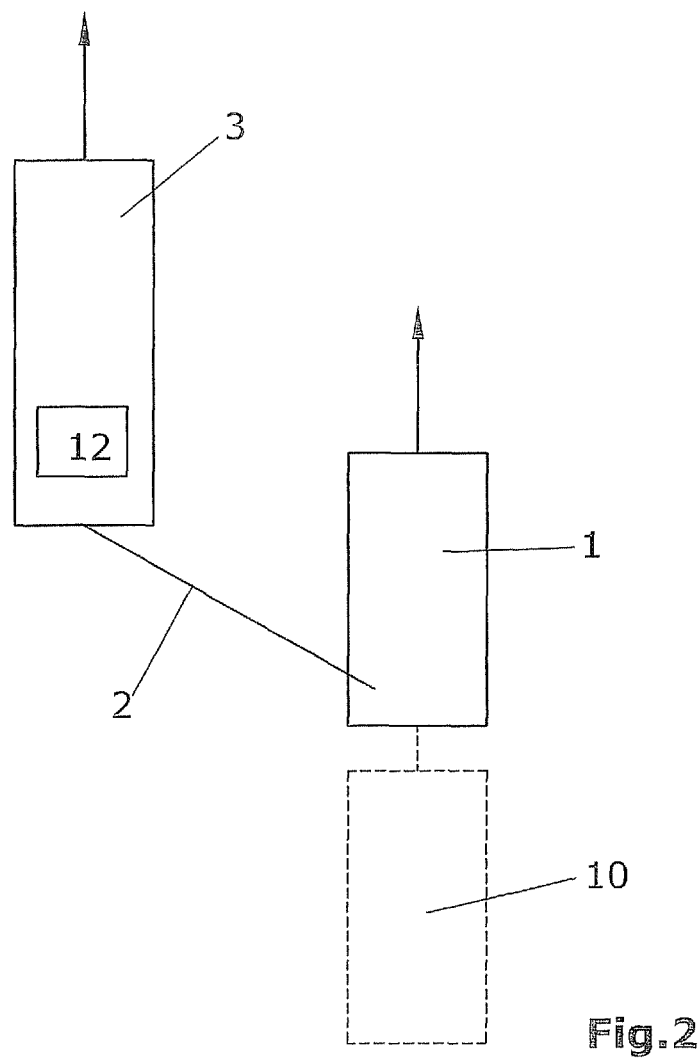

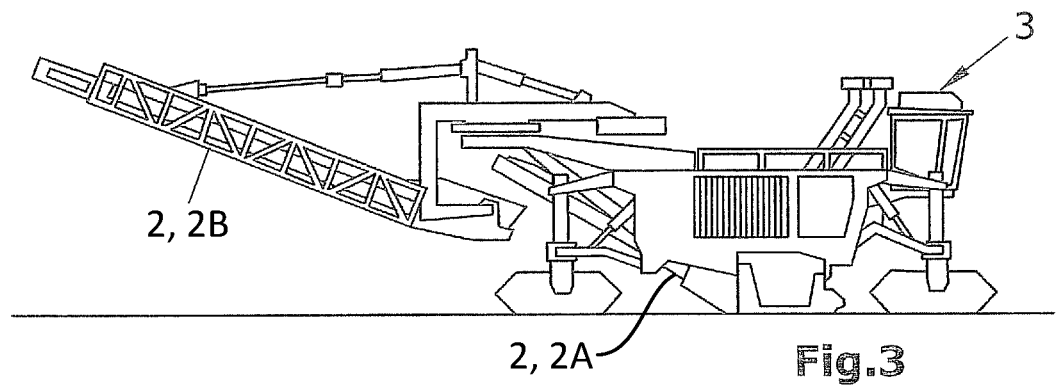
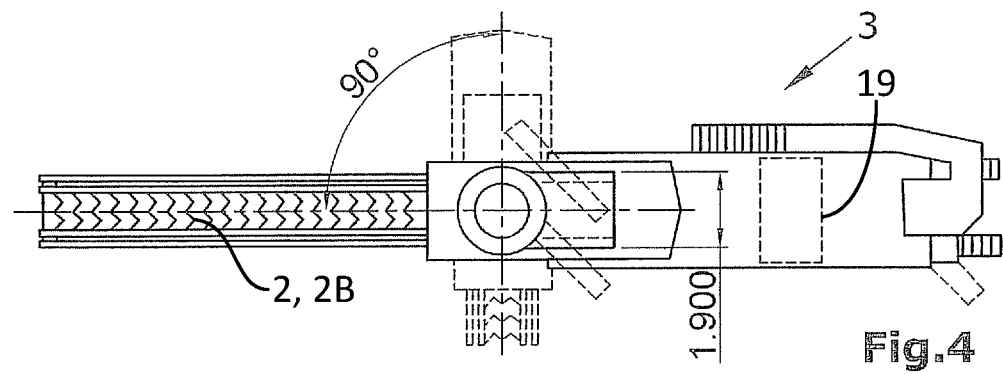

MILLING MACHINE, IN PARTICULAR SURFACE MINER, AND METHOD FOR MINING MILLED MATERIAL OF AN OPEN CAST SURFACE

The invention relates to a method for milling a ground surface, as well as to a milling machine.

In mining, earthwork and rock operations, the mining of solid earth materials in the form of milled material offers a great advantage over drilling and blasting as it can be performed with much greater economic efficiency.

The milling machine, generally called a surface miner, is able to crush the mined material to such a small size that it can be processed without any or requiring only minor subsequent treatment. The material removed by a milling drum is loaded, via loading conveyors, onto a truck that travels along next to the milling machine. In the process, the milled material is cut, crushed and finally loaded.

A known method provides that the ground surface of an opencast mining surface is milled along a predetermined milling track having a predetermined length. In the process, the milling operation is optimized, in terms of milling depth and milling speed, in accordance with the machine's power and the type of material to be milled.

The milled material is transported via a conveying device to at least one container of a truck that travels along next to the milling machine, said truck having a predetermined maximum loading volume per load. Once the truck is fully loaded, it is replaced with an unloaded truck.

At the end of the milling track, the milling machine turns so that an adjoining milling track can be removed. It is of disadvantage in this process that the truck may not be fully loaded at the end of the milling track so that the vehicle either needs to transport the milled material away being only partially loaded, or else needs to wait for the turning manoeuvre to be completed, in which case the working process will have to be interrupted once again during the next truck change until changing of the trucks has been completed. In order to minimize the breaks in operation, it is also known to use truck and trailer combinations that are provided with one or several trailers. With such truck and trailer combinations, there is the problem all the more, however, of the truck and trailer combination not being fully loaded at the end of the milling track. As such a truck is not able to perform a turning manoeuvre, there is the problem all the more in this arrangement of it not being possible to fully load the truck and trailer combination.

A further problem lies in loading the container of a truck evenly in order to be able to make maximum use of the container volume.

It is therefore the object of the present invention to specify a method for milling an opencast mining surface that can be performed with greater economic efficiency.

To this end, the following is provided in accordance with the method according to the present invention:
calculation of the maximum total loading volume resulting over the length of the current milling track as a function of the current effective working width and a milling depth that has been optimized in relation to a predetermined, preferably maximum milling power,
calculation of the number of truck loads required for the maximum total loading volume of a milling track,
determination of an effective total loading volume of the current milling track, which results from the volume of the nearest whole number of loads, and
adjustment of the adjustable total milling volume of the milling machine over the length of the milling track to match the effective total loading volume that results in a whole number of loads.

The invention enables the milling operation to be optimized in such a manner that, at the end of a current milling track, the container of a truck is, or containers of a truck are, also completely filled so that journeys of the trucks or truck and trailer combinations with containers not fully loaded are avoided, thus also minimizing the number of breaks in operation for the purpose of changing the trucks.

At the same time, the advance speed may be increased, for example, when working at a reduced milling depth so that the time required for milling off a milling track can be reduced.

It is preferably provided that the adjustable total milling volume of the milling machine in a milling track is adjusted to match a total loading volume which results from the volume of the nearest lower whole number of loads.

In this case, adjustment of the total milling volume to match the specified effective total loading volume is preferably effected by altering the milling depth. The reason for this is that, by reducing the milling depth, the total milling volume within a milling track can be reduced in such a fashion that it corresponds to the specified effective total loading volume that enables a whole number of loads to be achieved in a milling track.

An alternative possibility consists in adjusting the total milling volume to match the specified effective total loading volume by altering the effective working width by selecting a different overlap of adjoining milling tracks.

In this case, the milling depth optimized for the milling process is maintained, and the reduction of the total milling volume for adjustment to the total loading volume is adjusted by partly travelling over the previous milling track.

It is provided in this arrangement that the advance speed of the milling machine is adjusted to match the effective total milling volume in such a fashion that a preselected milling power, preferably maximum milling power, is maintained or achieved.

In order to improve the effectiveness of the milling process and the even loading of the container, it may also be provided that the travel speed of the truck is controlled, as a function of the advance speed of the milling machine, in such a fashion that the loading space of the at least one container is loaded evenly and fully over the length up to the maximum loading volume.

This is preferably effected by regulating the loading process by means of controlling the travel speed of the truck as a function of the advance speed of the milling machine and of the measured loading condition of a container.

The travel speed or the current position of the truck may alternatively be controlled as a function of the advance speed of the milling machine, or of the distance travelled by the milling machine in the current milling track, or of the current discharge position of the transport device.

It may further be provided that the travel speed or the current position of the truck is controlled in such a fashion that the discharge position of the conveying device above the at least one container moves from a front or rear end position inside the container to an end position that is opposite in longitudinal direction.

The travel speed of the truck is preferably controlled in such a fashion that the travel speed of the truck is higher than or equal to the advance speed of the milling machine.

It may alternatively be provided that the travel speed of the truck is controlled in such a fashion that the travel speed shows a constant positive difference to the advance speed of the milling machine.

It may alternatively be provided that the travel speed of the truck is controlled in such a fashion that the travel speed of the truck is altered in a discontinuous fashion.

At the beginning of the loading process, it may be provided that controlling the travel speed of the truck at a higher travel speed than the advance speed of the milling machine begins only after a sufficiently high initial fill has been discharged at the front or rear end position.

The method can be applied to advantage in particular when truck and trailer combinations with several trailers connected to one another in an articulated fashion are used.

In order to enable a continuous loading process, it is particularly advantageous in this arrangement if containers on several trailers connected to one another in an articulated fashion are used in which the upper end edges of the opposite end walls of adjacent containers overlap.

Containers may be used in this arrangement, the opposite end walls of which are provided with a mutually adapted curvature about an axis orthogonal to the ground surface in such a fashion that the opposite end walls have a smallest possible mutual distance but enable a mutual turning movement of the trailers both laterally and in a ramp transition area nonetheless.

Containers may also be used, the front end wall side of which is curved in a convex manner and is provided, preferably at the front end edge, with a projecting collar that covers a driver's cabin of the truck and/or the rear upper concavely curved end edge of the end wall of a container travelling ahead.

In the following, one embodiment of the invention is explained in greater detail with reference to the drawings.

Figure 6:
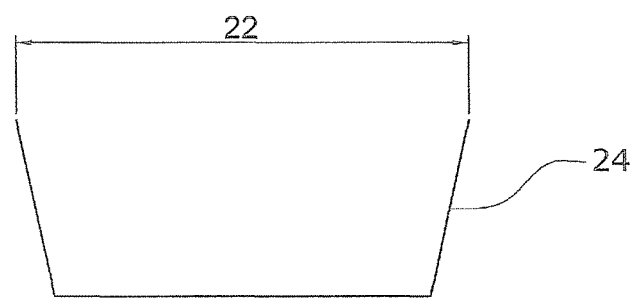
Figure 7:
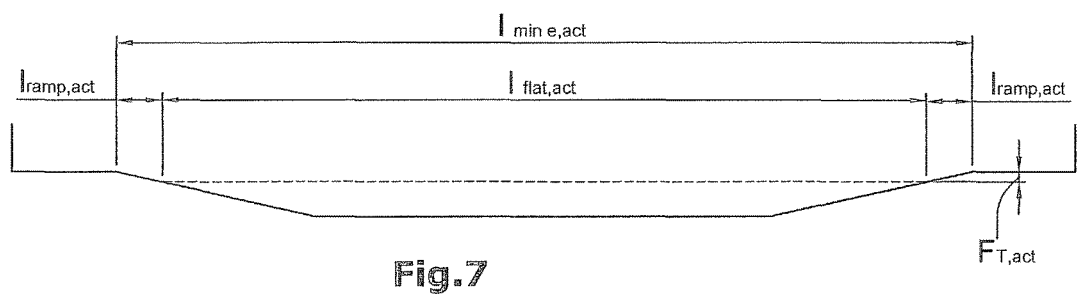
Figure 8:
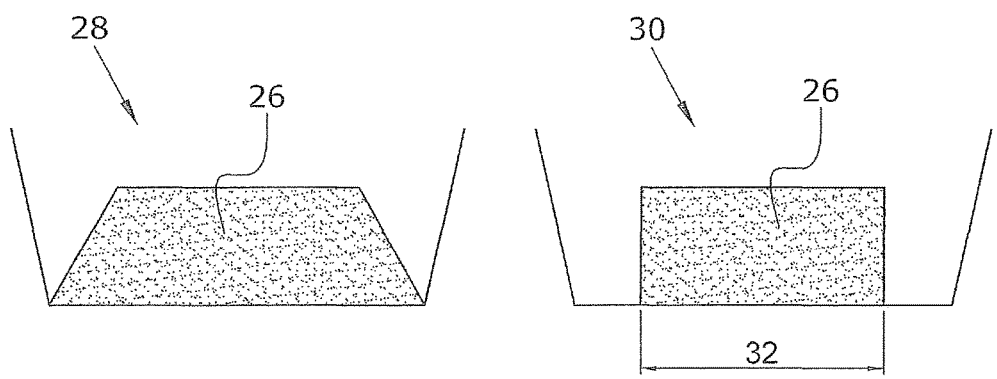
Figure 9:
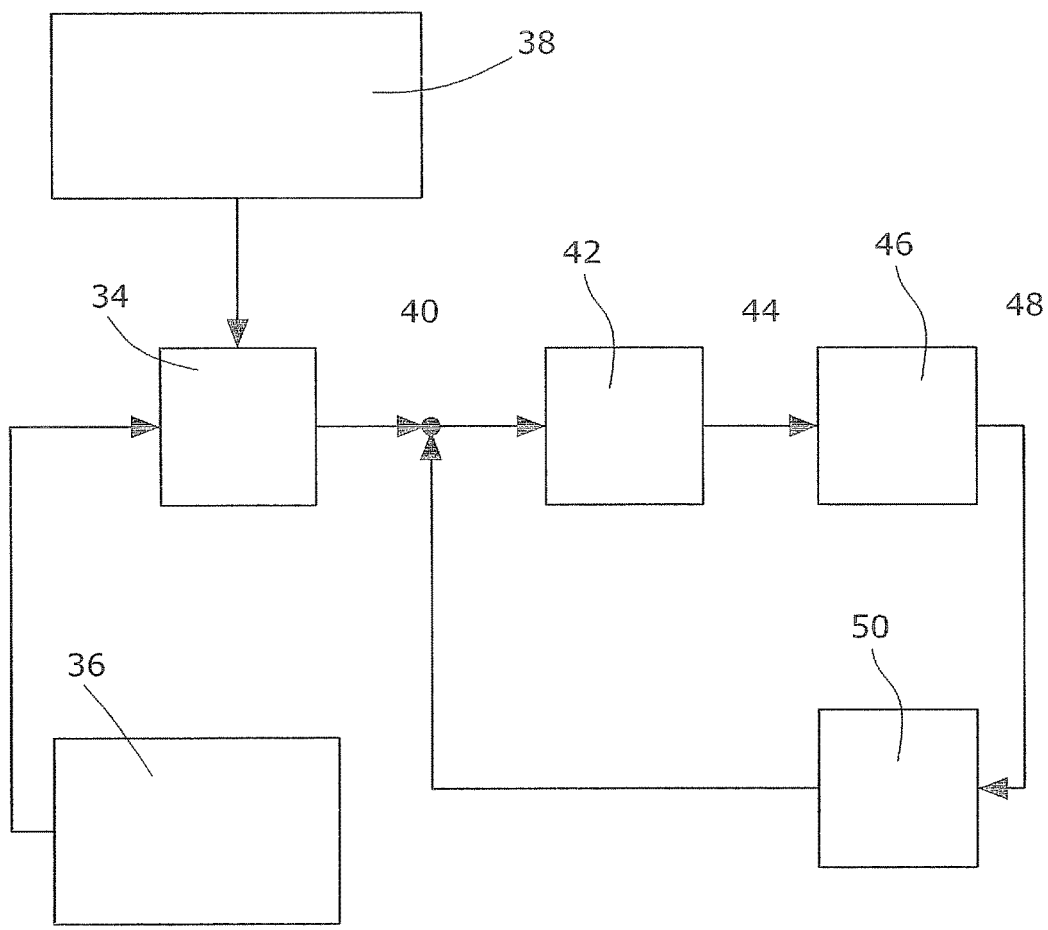

FIG. 1 a graphic representation of a so-called opencast pit of an opencast mining surface, FIG. 2 loading of a container of a truck via a transport conveyor of the milling machine, FIG. 3 a side view of a surface miner, FIG. 4 a top view of a surface miner, FIG. 5 a complete cross-section of a pit in the working direction of the milling machine, FIG. 6 a complete cross-section of a pit transverse to the working direction, FIG. 7 definition of the actual cutting depth, FIG. 8 material heaps with realistic and idealized loading, and FIG. 9 a basic structure of a truck control unit.

FIG. 1 shows an opencast pit of an opencast mining surface, wherein the reference symbol 4 shows the ground surface to be processed, the area 6 shows a ramp which leads to an elevated turning area 8 in the respective periphery of the opencast pit. The surface miner 3 can turn in said turning area 8 after a milling track has been removed in order to process an adjoining milling track in the opposite direction.

An opencast pit has a size of, for example, approx. 100 m in width and approx. 500 m in length.

As can be seen from FIGS. 2, 3 and 4, the milled material removed by the surface miner 3, such as ore or coal, is loaded via a transport conveyor 2 made up of first conveyor 2A and second conveyor 2B seen in FIG. 3, directly from milling drum 19 seen in FIG. 4, onto a truck 1 that may also be provided with one or several containers 10. A container is located on the truck 1, said container having a loading volume of, for instance, 100 t. Truck and trailer combinations with a total number of three containers of 100 t each mounted on trailers are frequently used, so that the total loading capacity of such a truck load amounts to approx. 300 t. When a truck with a 100-t container is used, changing of the trucks needs to be performed approx. 16 to 17 times over the length of a milling track of approx. 500 m. This means that a short break in operation during changing of the trucks is required after every 30 m already, as the transport conveyor needs to be stopped and, due to the high milling power of the milling machine, the milling process thus also needs to be interrupted briefly during changing of the vehicles. Thus the truck 1 is continuously loaded during the milling operation, until such time as the conveyor 2A, 2B is stopped and the milling process is stopped briefly, after one truck 1 has been fully loaded, to allow the changing of trucks 1.

FIG. 2 shows a surface miner 3 that is provided with a control unit 12 for controlling the removal process during the mining of milled material of an opencast mining surface or during the milling off of layers of an asphalt or concrete traffic surface, and for controlling the transporting away of the removed milled material for loading onto a truck.

The ground surface is removed along a predetermined milling track having a predetermined length.

The milled material is conveyed via a conveying device, for instance, a transport conveyor 2, to at least one container of a truck 1 that travels along next to the milling machine, said truck 1 having a predetermined maximum loading volume per load.

A fully loaded truck is replaced with an unloaded truck when the maximum loading volume of a truck load has been reached.

The control unit 12 of the milling machine 3 calculates the maximum total loading volume resulting over the length of the current milling track as a function of the current effective working width and a milling depth that has been optimized in relation to a predetermined, preferably maximum milling power, the number of truck loads required for the maximum total loading volume of a milling track, and determines an effective total loading volume of the current milling track, which results from the nearest whole number of loads.

The control unit 12 then adjusts the adjustable total milling volume of the milling machine over the length of the milling track to match the effective total loading volume that results in a whole number of loads.

For the purpose of setting and adjusting the total milling volume, the control unit 12 can calculate the effective total loading volume which results from the nearest lower whole number of loads.

For the purpose of adjusting the adjustable total milling volume to match the specified effective total loading volume, the control unit 12 can alter, preferably reduce, the milling depth.

For the purpose of adjusting the adjustable total milling volume to match the specified effective total loading volume, the control unit 12 can alternatively alter the effective working width by selecting a different overlap of adjoining milling tracks.

The control unit 12 can set the advance speed of the milling machine to a preselected milling power, preferably maximum milling power.

In addition, the control unit 12 can control the travel speed of the truck as a function of the advance speed of the milling machine in such a fashion that the loading space of the at least one container is loaded evenly and fully over the length up to the maximum loading volume.

The control unit 12 can regulate the loading process of at least one container by controlling the travel speed of the truck as a function of the advance speed of the milling machine and of the measured loading condition of the container.

The control unit 12 can control the travel speed or the current position of the truck as a function of the advance speed of the milling machine, or of the distance travelled by the milling machine in the current milling track, or of the current discharge position of the transport device in relation to the truck.

In this arrangement, the control unit 12 can control the travel speed or the current position of the truck in such a fashion that the discharge position of the conveying device above the at least one container moves from a front or rear end position inside the container to an end position that is opposite in longitudinal direction.

Preferably, the control unit can control the travel speed of the truck in such a fashion that the travel speed of the truck is higher than or equal to the advance speed of the milling machine.

The control unit 12 can increase the travel speed of the truck only after a sufficiently high initial fill has been reached at the front or rear end position.

The containers may be arranged on several trailers connected to one another in an articulated fashion, in which case the adjacent upper end edges of the opposite end walls overlap.

The adjacent end walls of the containers on the several trailers connected to one another in an articulated fashion may be provided with a mutually adapted curvature about an axis orthogonal to the ground surface in such a fashion that the end walls have a smallest possible mutual distance but enable a lateral turning movement of the trailers nonetheless.

The containers may be curved in a convex manner at the front end wall side and be provided, preferably at the front end edge, with a projecting collar that covers a driver's cabin of the truck and/or the rear upper concavely curved end edge of the end wall of a container travelling ahead.

A dimensioning and control concept for automated opencast mining is described in the following. The procedure comprises the following steps:
- calculation/dimensioning of the cutting depth for each layer (as a function of a "vertical" opencast mining process, assuming that the pit dimensions are known) to achieve optimal truck loading for each layer,
- application of a control concept for the opencast mining/loading process to achieve optimal truck loading at minimized control and communication efforts.

The fundamental advantage of the following control concept lies in the fact that a continuous loading process between truck and opencast milling machine, where both machines travel at a constant speed, is especially easy to realize with regard to the control concept and requires almost no communication between the milling machine and the truck (except at the beginning and at the end of the loading process).

The principle of the present invention consists in controlling the truck speed and direction as a function of the actual position and speed of the milling machine (or of the position and speed of the conveyor belt of the milling machine respectively), the cutting depth and cutting width of the milling machine and other process parameters known in advance, such as the maximum payload of the truck, the equivalent loading length of the truck and the density of the milled material.

Calculation of the optimal cutting depth as a function of the vertically progressing layer mining process:

General Definitions And Relations:

Known Process Parameters And Variables:

$l_{min\ e,max}$ in [m]: maximum total horizontal distance to be mined without the milling machine turning back (including the ramp and the flat part; see FIG. 5)

$\alpha_{ramp}$ in [m]: mining ramp angle; see FIG. 5

$\rho_{mat}$ in [t/m$^3$]: density of the mined material $M_{pay}$ in [t]: payload of the truck L in [–]: loosening factor, relation between the density of the cut material and the density of the loaded material $F_{T,max}$ in [m]: maximum cutting depth $F_B$ in [m]: cutting width $F_{T,act}$ in [m]: actual cutting depth Unknown process variables to be determined (in the sequence of clarification):

$l_{min\ e,act}$ in [m]: actual total horizontal distance to be mined without the milling machine turning back (including the ramp and the flat part; see FIG. 5)

$l_{ramp,act}$ in [m]: actual horizontal distance to be mined while the milling machine is on the ramp; see FIG. 7

$l_{flat,act}$ in [m]: actual horizontal distance to be mined while the milling machine is on the flat part of the pit cross-section; see FIG. 7

$Q_{ramp,act}$ in [m$^3$]: material volume to be loaded on the ramp $Q_{flat,act}$ in [m$^3$]: material volume to be loaded on the flat part of the mining track $Q_{total,act}$ in [m$^3$]: total material volume to be loaded in a single track $M_{total,act}$ in [t]: total weight to be loaded in a single track $n_{trucks}$ in [–]: number of trucks required for the total load of a single track.

FIG. 1 shows a top view of the sample of a pit, and FIGS. 5 and 6 show the relevant cross-sections. A complete pit cross-section in the working direction of the milling machine is depicted in FIG. 5. In FIG. 5, 16 depicts the maximum pit length, 18 depicts the maximum mining length, 21 depicts the maximum mining depth, and 20 depicts the mining ramp, said mining ramp having a slope of, for instance, 1:10~5.71°. The complete pit cross-section transverse to the working direction is depicted in FIG. 6. In FIG. 6, 22 depicts the maximum mining depth, and 24 depicts the mining ramp, said mining ramp having a slope of, for instance, 1:0.25~76°. Let it be assumed that the total pit dimensions as well as the cross-section are known prior to the start of the mining process. Determination of the dimensions is typically performed prior to the start of the mining process by means of an extensive analysis of drilling samples.

Calculation procedure:

Start at the top of the pit by adjusting $l_{min\ e,\ act}$ to the beginning of the track length and by adjusting the cutting depth to the maximum cutting depth Calculate the number of trucks required by means of the cited procedure Reduce the number of trucks required to the next smaller whole number Recalculate the cutting depth and the actual horizontal distance on the flat part $l_{flat,act}$ Set $l_{flat,act}$ as the starting value for $l_{min\ e,\ act}$ to calculate the next cutting depth The material volume that needs to be loaded on a ramp can be calculated from $$Q_{ramp,act} = \frac{1}{2} \cdot l_{ramp,act} \cdot F_{T,act} \cdot F_B \cdot L.$$

In a similar fashion, the material volume that needs to be loaded on the flat part can be derived from $$Q_{flat,act} = l_{flat,act} \cdot F_{T,act} \cdot F_B \cdot L.$$

The total material that needs to be loaded for the entire track is simply $$Q_{total,act} = Q_{flat,act} + 2 \cdot Q_{ramp,act}.$$

Substituting the material volume of the ramp and the flat part results in $$Q_{total,act} = l_{flat,act} \cdot F_{T,act} \cdot F_B \cdot L + 2 \cdot \frac{1}{2} \cdot l_{ramp,act} \cdot F_{T,act} \cdot F_B \cdot L,$$

which can be further simplified to $$Q_{total,act} = \underbrace{(l_{flat,act} + l_{ramp,act})}_{l_{min\ e,act}} \cdot F_{T,act} \cdot F_B \cdot L$$

The total weight to be loaded is $$M_{total,act} = Q_{total,act} \cdot \rho_{mat}$$

The number of truck loads required for the total load is $$n_{trucks} = M_{total,act}/M_{pay}.$$

A recalculation of the required cutting depth can now be performed quite easily by solving the aforementioned equations for the cutting depth, which results in $$F_{T,act} = \frac{Q_{total,act}}{F_B \cdot L \cdot l_{min\ e,act}}.$$

The current total horizontal distance of the flat part can be determined by initially calculating the distance of the ramp $$l_{ramp,act} = \frac{F_{T,act}}{\tan(\alpha_{ramp})}.$$

The remaining distance of the flat part $l_{flat,act}$ can then be calculated from (FIG. 7)

$$l_{flat,act} = l_{min\ e,act} - 2 \cdot l_{ramp,act}.$$

The total horizontal distance $l_{min\ e,act}$ for calculation of the next layer equals the last calculated distance of the flat part $$l_{min\ e,act} = l_{flat,act},$$

with the exception of the first calculation, where said length needs to be set to the maximum initial horizontal distance $l_{min\ e,max}$.

FIG. 8 shows material heaps 26 with realistic and idealized loading 28, 30, with 32 depicting the loading length.

Control Law For The Truck Speed:
General Definitions And Relations
Known Process Parameters And Variables:
$F_T$ in [m]: cutting depth
$F_B$ in [m]: cutting width
$v_{SM}$ in [m/min]: advance speed of the milling machine
$M_{pay}$ in [t]: payload of the truck
L in [–]: loosening factor, relation between the density of the cut material and the density of the loaded material
$\rho_{mat}$ in [t/m³]: density of the mined material
$l_{lc}$ in [m]: equivalent loading length of the truck
Unknown process variables to be determined (in the sequence of clarification):
$t_{lc}$ in [min]: truck loading time
$Q_{lc}$ in [m³]: material volume for one loading cycle
$\dot{q}$ in [m³/min]: material flow rate from the milling machine
$A_{tray,cr}$ in [m²]: loadable cross-sectional area of the truck tray
$v_{Truck}$ in [m/min]: truck speed in forward direction
Where: [min]: minutes [m]: meters [m³/min]: cubic meters per minute The truck-loading cross-sectional area as a function of the surface milling machine speed, the cutting depth, the cutting width and the truck speed can be calculated by using the following simple assumptions and relations:

The material can be loaded onto the truck without any angle of repose (see FIG. 8 for illustration).
The truck 1 and the milling machine 3 travel at a constant speed.
The truck 1 starts loading at the front end of the truck tray and travels faster than the milling machine.
There is no storage of material in the milling machine 3. Thus the milled material is moved continuously from the milling drum 19 to the truck 1 by the conveyors 2A, 2B without being stored in the milling machine 3.
A constant loosening of the cut material takes place, i.e. the material delivered by the conveying device equals the cut material, multiplied by the loosening factor.

The material delivered by the milling machine 3 during a specific loading time $t_{lc}$ can be calculated from $$Q_{lc} = F_T \cdot F_B \cdot v_{SM} \cdot L \cdot t_{lc} = \dot{q} \cdot t_{lc}.$$

The resulting cross-sectional loading area of the truck tray can be calculated from $$A_{tray,cr} = Q_{lc}/l_{lc}$$

where $l_{lc}$ represents an equivalent loading length assuming that the load deposited on the truck resembles a cuboid.

By substituting the material volume and the loading length one obtains $$A_{tray,cr} = F_T \cdot F_B \cdot L \cdot \frac{v_{SM}}{v_{Truck} - v_{SM}}, \qquad (1)$$

which means that for a given cutting depth, a given cutting width and a given loosening factor the cross-sectional loading area is a function of the milling machine speed and the difference of milling machine speed and truck speed. This relation can be verified quite easily. Assuming that the truck is stationary ($V_{truck}=0$), it results from the aforementioned relation that $$A_{tray,cr} = F_T \cdot F_B \cdot L,$$

which means that the material cross-section to be cut by the milling machine, multiplied by the loosening factor, needs to be stored in the truck 1.

To be able to obtain a particular cross-sectional loading area of the truck tray, equation (1) produces a control law for adjusting the truck speed and/or the milling machine speed for a given cutting depth and cutting width. In practice, the loading area is subject to a limitation that is due to the maximum payload of the truck tray. With a given maximum payload of the truck tray, the maximum material volume that can be loaded during one loading cycle is defined by $$Q_{lc,max} = M_{pay}/\rho_{mat}$$

The maximum material volume can then be translated into a maximum cross-sectional loading area $$A_{tray,cr,max} = Q_{lc,max}/l_{lc} \quad (2).$$

Inserting (2) into (1) and solving (1) for the truck speed produces a feedforward control law for the truck speed:

$$^v Truck = {^v SM}\left(1 + \frac{F_T \cdot F_B \cdot L \cdot \rho_{mat} \cdot l_{lc}}{M_{Pay}}\right).$$

The basic structure of a truck control unit is depicted in FIG. 9. The truck position and speed feedforward control unit 34 includes a feedforward control rule for the truck speed and for mapping the conveyor position onto the truck position. The truck position and speed feedforward control unit 34 includes measuring values 36, such as absolute conveyor positions and speeds, actual cutting depth and actual milling machine speed. Additional parameters 38 exist, such as the maximum payload of the truck, the loosening factor, the material density, the equivalent loading length of the truck tray, or the cutting width. 40 depicts the commanded speeds and positions (direction and amplitude), 42 depicts the truck control device, 44 depicts the control commands, speed commands, 46 depicts the truck, 48 depicts the absolute truck position, and 50 depicts the ATS/GPS.

What is claimed is:

1. A method of milling a ground surface, comprising:
   (a) milling the ground surface along a milling track with a milling machine;
   (b) loading a container of a truck that travels adjacent to the milling machine by transporting milled material via a conveying device directly from a milling drum of the milling machine to the container; and
   (c) regulating the loading of step (b) by automatically generating one or more commanded speeds and positions for the truck as a function of at least a current discharge position of the conveying device.

2. The method of claim 1, further comprising:
   interrupting steps (a), (b) and (c) when a maximum loading volume of the truck has been reached;
   replacing the fully loaded truck with an unloaded truck; and
   repeating steps (a), (b) and (c) with the unloaded truck.

3. The method of claim 1, wherein:
   step (c) further comprises mapping a conveyor device position onto a truck position.

4. The method of claim 1, wherein:
   step (c) further comprises measuring an absolute conveyor device position and an absolute truck position.

5. The method of claim 1, further comprising:
   temporarily stopping the milling of step (a) and the loading of step (b), after the container is fully loaded;
   then replacing the container with a new container; and
   then resuming steps (a)-(c) to load the new container.

6. The method of claim 1, wherein:
   step (b) is performed continuously during step (a).

7. The method of claim 1, wherein:
   in step (b) the milled material is transported directly from the milling drum to the container without being stored in the milling machine.

8. A method of milling a ground surface, comprising:
   (a) milling the ground surface along a milling track with a milling machine having a milling drum and a conveyor extending from the milling drum to a conveyor discharge position;
   (b) during step (a), continuously loading a container of a truck that travels adjacent to the milling machine by transporting milled material via the conveyor from a milling drum of the milling machine to the container; and
   (c) regulating the loading of step (b) by automatically generating one or more commanded speeds and positions for the truck as a function of at least the conveyor discharge position.

9. The method of claim 8, wherein:
   in step (b) the milled material is transported from the milling drum to the container without being stored in the milling machine.

10. The method of claim 8, further comprising:
    temporarily stopping the milling of step (a) and the loading of step (b), after the container is fully loaded;
    then replacing the container with a new container; and
    then resuming steps (a)-(c) to load the new container.

11. A method of milling a ground surface, comprising:
    (a) milling the ground surface along a milling track with a milling machine having a milling drum and a conveyor extending from the milling drum to a conveyor discharge position;
    (b) during step (a), loading a container of a truck that travels adjacent to the milling machine by transporting milled material via the conveyor from a milling drum of the milling machine to the container without storing the milled material on the milling machine; and
    (c) regulating the loading of step (b) by automatically generating one or more commanded speeds and positions for the truck as a function of at least the conveyor discharge position.

12. The method of claim 11, further comprising:
    temporarily stopping the milling of step (a) and the loading of step (b), after the container is fully loaded;
    then replacing the container with a new container; and
    then resuming steps (a)-(c) to load the new container.

* * * * *